United States Patent
Lorenz et al.

[11] 3,872,185
[45] *Mar. 18, 1975

[54] O-(N-ALKOXY-BENZIMIDOYL)-(THIONO)-PHOSPHORIC (PHOSPHONIC) ACID ESTERS

[75] Inventors: Walter Lorenz, Wuppertal; Ingeborg Hammann; Wolfgang Behrenz, both of Cologne; Wilhelm Stendel, Wuppertal, all of Germany

[ * ] Notice: The term of this patent subsequent to Sept. 18, 1990 has been disclaimed.

[73] Assignee: Bayer Aktiengesellschaft, Leverkusen, Germany

[22] Filed: Mar. 26, 1973

[21] Appl. No.: 344,798

[30] Foreign Application Priority Data
Apr. 6, 1972 Germany............................ 2216551

[52] U.S. Cl................................. 260/944, 424/211
[51] Int. Cl.......... C07f 9/08, C07f 9/40, A01n 9/36
[58] Field of Search ..................................... 260/944

[56] References Cited
UNITED STATES PATENTS

| | | | |
|---|---|---|---|
| 3,597,504 | 8/1971 | Richter et al....................... | 260/944 |
| 3,597,506 | 8/1971 | Richter et al....................... | 260/944 |
| 3,760,041 | 9/1973 | Lorenz et al....................... | 260/944 |

*Primary Examiner*—Anton H. Sutto
*Attorney, Agent, or Firm*—Burgess, Dinklage & Sprung

[57] ABSTRACT

O-(N-alkoxy-benzimidoyl)-(thiono)-phosphoric (phosphonic) acid esters of the formula

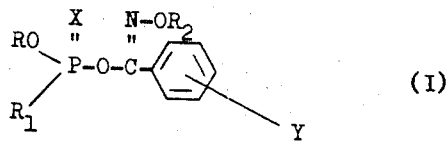

in which
R and $R_2$ each independently is alkyl of 1 to 6 carbon atoms,
$R_1$ is alkyl or alkoxy of 1 to 6 carbon atoms,
X is oxygen or sulfur, and
Y is lower alkoxy or alkylmercapto, which possess insecticidal and acaricidal properties.

7 Claims, No Drawings

O-(N-ALKOXY-BENZIMIDOYL)-(THIONO)-PHOSPHORIC (PHOSPHONIC) ACID ESTERS

The present invention relates to and has for its objects the provisions of particular new 0-(N-alkoxybenzimidoyl)-(thiono)-phosphoric (phosphonic) acid esters, i.e. 0,0-dialkoxy-0-[N-alkoxy-(alkoxy- or alkylmercapto)benzimidoyl]-phosphoric acid esters, their alkane phosphonic acid counterparts and their thiono analogues, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids and especially ectoparasites, with other and further objects becoming apparent from a study of the within specification and accompanying examples.

It is known from German Published specification DAS 1,141,277 that S-(N-alkylbenzimidoyl)-(thiono)-thiolphosphoric acid esters, for example 0,0-diethyl-S-(N-methyl-benzimidoyl)-thionothiolphosphoric acid ester (Compound A), are distinguished by insecticidal and acaricidal activity.

The present invention provides 0-(N-alkoxybenzimidoyl)-(thiono)-phosphoric(phosphonic) acid esters of the general formula

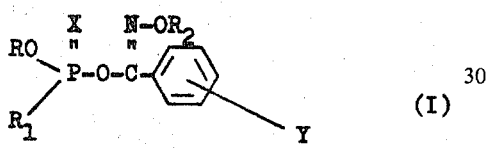

(I)

in which
R and $R_2$ each independently is alkyl of 1 to 6 carbon atoms,
$R_1$ is alkyl or alkoxy of 1 to 6 carbon atoms,
X is oxygen or sulfur, and
Y is lower alkoxy or alkylmercapto.

Preferably R is a straight-chain or branched lower alkyl radical with 1 to 4 carbon atoms, $R_1$ is lower alkyl or alkoxy radical with 1 to 4 carbon atoms, $R_2$ is methyl, ethyl, n-propyl or iso-propyl, and Y has 1 to 4 carbon atoms and especially is methoxy, ethoxy, methylmercapto or ethylmercapto.

Surprisingly, the compounds according to the invention display a considerably better insecticidal and acaricidal action than the known S-(N-alkylbenzimidoyl)-(thiono)thiolphosphoric acid esters of analogous structure and identical type of action. The new compounds can be used especially successfully in the veterinary field against animal parasites (ectoparasites), such as parasitic fly larvae. The compounds according to the invention thus represent a genuine enrichment of the art.

They furthermore contribute to meeting the great demand for constantly new active compounds in the field of pesticides. This demand arises from the fact that constantly higher demands are made of commercially available agents, particularly as regards the protection of the environment, such as low toxicity to warm-blooded animals and low phytotoxicity, rapid degradation in and on the plant in shorter minimum intervals to be observed between spraying with pesticide and harvesting, and activity against resistant pests; thus, for example, over the course of the years blowfly larvae have, in various areas, become resistant against the phosphoric acid esters and carbamates hitherto employed, so that the success in combating them is dubious in many areas. To secure economical raising of animals in areas subject to attack by blowfly, there is thus a demand for agents by means of which blowfly larvae even of resistant strains, for example of the genus Lucilia, can be combated reliably.

The active compounds according to the invention are effective both against the normal sensitive strains and against the largely resistant Goondiwindi strain of Lucilia cuprina.

The invention also provides a process for the production of an 0-(N-alkoxybenzimidoyl)-(thiono)-phosphoric-(phosphonic) acid ester of the formula (I) in which a (thiono)-phosphoric(phosphonic) acid ester halide of the general formula

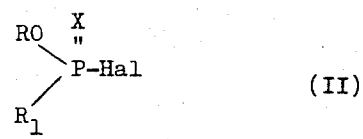

(II)

is reacted with a N-alkoxy-benzhydroxamic acid derivative of the general formula

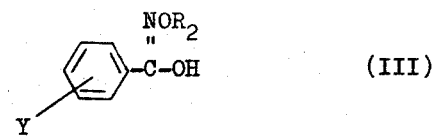

(III)

in the form of an alkali metal, alkaline earth metal or ammonium salt or in the presence of an acid-binding agent; in which formulae
R, $R_1$, $R_2$, X and Y have the abovementioned meanings, and
Hal denotes a halogen atom, preferably a chlorine atom.

If 0,0-dimethyl-thionophosphoric acid ester chloride and N-ethoxy-4-methoxy-benzhydroxamic acid are used as starting substances, the course of the reaction according to the invention can be represented by the following formula scheme:

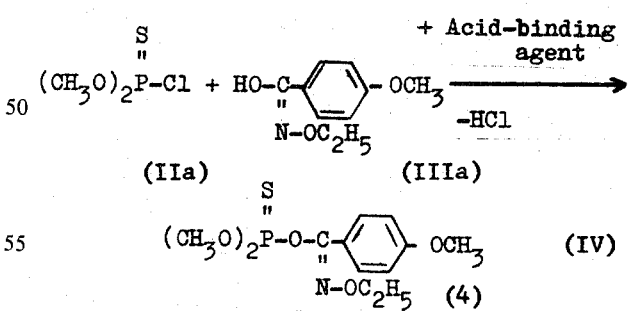

The formulae (II) and (III) provide an unambiguous general definition of the starting materials to be used.

The following may be mentioned as examples of (thiono)-phosphoric(phosphonic) acid ester halides (II) or N-alkoxybenzhydroxamic acid derivatives (III) to be employed in the process: 0,0-dimethyl-, 0,0-diethyl-, 0,0-dipropyl-, 0,0-disopropyl-, 0-methyl-0-ethyl-, 0-methyl-0-isopropyl-, 0-ethyl-0-isopropyl-, 0,0-dibutyl-, 0-tert.-butyl-0-methyl-, 0-butyl-0-ethyl, 0-butyl-0-isopropyl- and 0,0-di-tert.-butyl-phosphoric acid ester chloride or the corresponding thiono analogues, and also 0-methyl-methane-, 0-ethyl-propane-, 0-iso-propyl-ethane-, 0-butyl-methane-, 0-methyl-isopropane-, 0-methyl-ethane-, 0-ethyl-ethane, 0-propyl-methane-, 0-butyl-ethane-, 0-tert.-butyl-methane-, 0-ethyl-butane-, 0-iso-propyl-butane-, 0-butyl-butane and 0-ethyl-methane-phosphonic acid ester chloride and the corresponding thiono compounds; as well as N-methoxy-(2,3- or 4-methoxy-, -2-, -3- or 4-ethoxy-, -2-, -3- or -4-methylmercapto-, -2-, -3- or -4-ethylmercapto)-benzhydroxamic acid and the corresponding N-ethoxy, N-n-propoxy and N-isopropoxy derivatives.

The (thiono)-phosphoric(phosphonic)-acid ester halides (II) required as starting substances are known from the literature and can be prepared, as can the N-alkoxy-benzhydroxamic acid derivatives (III), in accordance with generally known processes, the latter, for example, from the corresponding benzhydroxamic acids with alcoholic potassium hydroxide solution and alkyl iodide (compare Waldstein: Ann. 181, 385) or from benzoyl chlorides and alkoxylamine (Gierke, Ann. 205, 278).

The process for preparing the new compounds is preferably carried out with the use of solvent or diluent. As such, practically all inert organic solvents can be employed. These include, in particular, aliphatic and aromatic, optionally chlorinated, hydrocarbons, such as benzene, toluene, xylene, benzine, methylene chloride, chloroform, carbon tetrachloride, chlorobenzene; ethers, for example diethyl and dibutyl ether, dioxane; ketones, for example acetone, methyl ethyl ketone, methyl isopropyl ketone, methyl isobutyl ketone; and nitriles, such as acetonitrile and propionitrile.

As acid acceptors it is possible to use all customary acid-binding agents. Alkali metal carbonates and alcoholates, such as sodium carbonate and potassium carbonate, sodium methylate and potassium methylate, and sodium ethylate and potassium ethylate, and also aliphatic, aromatic or heterocyclic amines, for example triethylamine, dimethylamine, dimethylaniline, dimethylbenzylamine and pyridine, have proved particularly successful.

The reaction temperature can be varied over a wide range. In general, it is about 0 to 100, preferably 40° to 70°C. The reaction is generally carried out under normal pressure.

To carry out the process, the starting compounds are in most cases employed in equimolar ratios. The reaction is preferably carried out in the presence of one of the above-mentioned solvents and in the presence of an acid acceptor, at the indicated temperatures, and after stirring for several hours - if appropriate with warming - the reaction mixture may be worked up in the usual manner.

The compounds according to the invention are in most cases obtained in the form of colorless to slightly colored oils which cannot be distilled without decomposition but can be freed of the last volatile constituents by so-called "slight distillation", that is to say by prolonged heating under reduced pressure to moderately elevated temperatures, and they can in this way be purified. They are characterized especially by their refractive indexes.

As already mentioned, the new 0-(N-alkoxy-benzimidoyl)-(thiono)-phosphoric(phosphonic) acid esters are distinguished by an excellent insecticidal and acaricidal activity against plant pests, hygiene pests and pests of stored products. Furthermore, the products are successfully employed in the veterinary field against animal ectoparasites, such as parasitic fly larvae. When used in this way, they possess a good action both against sucking and against biting insects and mites (Acarina). At the same time they display a very low phytotoxicity and are in part also active against soil insects. For this reason, the compounds according to the invention are successfully employed as pesticides in plant protection and the protection of stored products, and in the hygiene and veterinary field.

As animal ectoparasites there may be mentioned, from the class of the insects, Diptera larvae which are parasitic in warm-blooded animals, for example *Lucilia sericata*, *Lucilia cuprina*-sensitive and resistant strains, *Chrysomya chloropyga* and larvae of warble flies, for example the ox warble fly, *Hypoderma bovis*.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thsanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella meculipennis*), the gypsy moth (*Lymantria dispar*), the brown-tall moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and the greater wax moth (*Galleria mellonella*).

Also to be classed with the biting insects are beetles (Coleoptera), for example the granary weevil (*Sitophilus granarius* — *Colandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the estern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the novel products are also distinguished by an outstanding residual activity on wood and clay, as well as good stability to alkali on limed substrates.

The active compounds according to the instant invention can be utilized, if desired, in the form of the usual formulations or compositions with conventional inert (i.e. plant compatible or herbicidally inert) pesticide diluents or extenders, e.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperature and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially betweeen about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat therefore, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dipping, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples.

EXAMPLE 1

$(C_2H_5O)_2\overset{S}{\overset{\|}{P}}-O-\overset{N-OC_2H_5}{\overset{\|}{C}}-\underset{}{\underset{}{\bigcirc}}-OCH_3$ (1)

After stirring a mixture of 97.5 g (0.5 mol) of N-ethoxy-4-methoxybenzhydroxamic acid in 320 ml of acetonitrile and 82 g (0.59 mole) of ground potassium hydroxide for 30 minutes at 50°C, 84 g (0.45 mole) of 0,0-diethylthionophosphoric acid ester chloride were added dropwise. Thereafter the batch was stirred for a further 4 hours at 50°C, cooled and poured into water, and the oil which separated out was taken up in benzene. The organic phase was washed with water and was subsequently twice washed with 2 N sodium hydroxide solution until it reacted neutral. After drying the benzene layer, the solvent was removed by distillation and the residue was subjected to "slight" distillation. 150 g (96% of theory) of 0,0-diethyl-0-(N-ethoxy-4-methoxybenzimidoyl)-thionophosphoric acid ester of refractive index $n_D^{21}$: 1.5286 were obtained.

The following compounds were obtainable analogously:

Table 1

| Formula | Refractive index |
|---|---|
| $(CH_3O)_2\overset{S}{\overset{\|}{P}}-O-\overset{N-OCH_3}{\overset{\|}{C}}-\bigcirc-OCH_3$ (2) | $n_D^{22}$ : 1.5561 |
| $(C_2H_5O)_2\overset{S}{\overset{\|}{P}}-O-\overset{N-OCH_3}{\overset{\|}{C}}-\bigcirc-OCH_3$ (3) | $n_D^{20}$ : 1.5292 |
| $(CH_3O)_2\overset{S}{\overset{\|}{P}}-O-\overset{N-OC_2H_5}{\overset{\|}{C}}-\bigcirc-OCH_3$ (4) | $n_D^{21}$ : 1.5286 |
| $(C_2H_5O)_2\overset{S}{\overset{\|}{P}}-O-\overset{N-OC_2H_5}{\overset{\|}{C}}-\bigcirc$ with $OCH_3$ (5) | $n_D^{20}$ : 1.5248 |
| $(C_2H_5O)_2\overset{S}{\overset{\|}{P}}-O-\overset{N-OC_2H_5}{\overset{\|}{C}}-\bigcirc-OCH_3$ (6) | $n_D^{21}$ : 1.5286 |
| $(CH_3O)_2\overset{S}{\overset{\|}{P}}-O-\overset{N-OC_2H_5}{\overset{\|}{C}}-\bigcirc$ with $OCH_3$ (7) | $n_D^{21}$ : 1.5324 |
| $(C_2H_5O)_2\overset{S}{\overset{\|}{P}}-O-\overset{N-OCH_3}{\overset{\|}{C}}-\bigcirc$ with $OCH_3$ (8) | $n_D^{21}$ : 1.5296 |
| $(CH_3O)_2\overset{S}{\overset{\|}{P}}-O-\overset{N-OCH_3}{\overset{\|}{C}}-\bigcirc$ with $OCH_3$ (9) | $n_D^{21}$ : 1.5329 |
| $(CH_3O)_2\overset{S}{\overset{\|}{P}}-O-\overset{N-OCH_3}{\overset{\|}{C}}-\bigcirc$ with $OCH_3$ (10) | $n_D^{21}$ : 1.5468 |
| $(C_2H_5O)_2\overset{S}{\overset{\|}{P}}-O-\overset{N-OCH_3}{\overset{\|}{C}}-\bigcirc$ with $OCH_3$ (11) | $n_D^{20}$ : 1.5362 |
| $(C_2H_5O)_2\overset{S}{\overset{\|}{P}}-O-\overset{N-OC_2H_5}{\overset{\|}{C}}-\bigcirc$ with $OCH_3$ (12) | $n_D^{20}$ : 1.5236 |
| $(CH_3O)_2\overset{S}{\overset{\|}{P}}-O-\overset{N-OC_2H_5}{\overset{\|}{C}}-\bigcirc$ with $OCH_3$ (13) | $n_D^{21}$ : 1.5368 |

TABLE I—Continued

| Formula | Refractive index |
|---|---|
| $(C_2H_5O)_2\overset{S}{\underset{\|}{P}}-O-\overset{N-OC_2H_5}{\underset{\|}{C}}-\underset{SCH_3}{\text{[phenyl]}}$ (14) | $n_D^{21}$ : 1.5448 |
| $(CH_3O)_2\overset{S}{\underset{\|}{P}}-O-\overset{N-OC_2H_5}{\underset{\|}{C}}-\underset{SCH_3}{\text{[phenyl]}}$ (15) | $n_D^{21}$ : 1.5659 |
| $(C_2H_5O)_2\overset{S}{\underset{\|}{P}}-O-\overset{N-OCH_3}{\underset{\|}{C}}-\underset{SCH_3}{\text{[phenyl]}}$ (16) | $n_D^{21}$ : 1.5540 |
| $(CH_3O)_2\overset{S}{\underset{\|}{P}}-O-\overset{N-OCH_3}{\underset{\|}{C}}-\underset{SCH_3}{\text{[phenyl]}}$ (17) | $n_D^{21}$ : 1.5969 |

EXAMPLE 2

Phaedon larvae test

Solvent: 3 parts by weight of acetone
Emulsifier: 1 part by weight of alkyl aryl polyglycol ether To produce a suitable preparation of active compound, 1 part by weight of the active compound was mixed with the indicated amount of solvent, which contained the indicated amount of emulsifier, and the concentrate was diluted with water to the desired concentration.

Cabbage leaves (*Brassica oleracea*) were sprayed with the preparation of the active compound until dripping wet and were then infested with mustard beetle larvae (*Phaedon cochleariae*).

After the indicated periods of time, the degree of destruction was determined in %. Herein, 100% denotes that all the beetle larvae were killed. 0% denotes that no beetle larvae were killed.

The active compounds, the concentrations of the active compounds, the times of evaluation and the results can be seen from the following Table 2:

Table 2

(Insects which damage plants)

(Phaedon larvae test)

| Active compound | Active compound concentration in % by weight | Degree of destruction in % after 3 days |
|---|---|---|
| $\text{[phenyl]}-\overset{N-CH_3}{\underset{\|}{C}}-S-\overset{S}{\underset{\|}{P}}(OC_2H_5)_2$ (known) (A) | 0.1 | 0 |
| (9) | 0.1<br>0.01 | 100<br>100 |
| (11) | 0.1<br>0.01 | 100<br>100 |
| (8) | 0.1<br>0.01 | 100<br>70 |
| (3) | 0.1<br>0.01 | 100<br>40 |
| (17) | 0.1<br>0.01<br>0.001 | 100<br>100<br>65 |
| (16) | 0.1<br>0.01<br>0.001 | 100<br>100<br>85 |
| (7) | 0.1<br>0.01 | 100<br>90 |
| (5) | 0.1<br>0.01 | 100<br>70 |
| (1) | 0.1<br>0.01 | 100<br>60 |
| (15) | 0.1<br>0.01 | 100<br>100 |
| (14) | 0.1<br>0.01 | 100<br>100 |

EXAMPLE 3

Myzus test (contact action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 3:

EXAMPLE 4

Tetranychus test (resistant)
Solvent: 3 parts by weight of acetone
Emulsifier: 1 part by weight of alkylaryl of polyglycol ether To prduce a suitable preparation of active compound 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10–30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed whereas 0%

Table 3
(Myzus test)

| Active compound | Active compound concentration in % by weight | Degree of destruction in % after 1 day |
| --- | --- | --- |
| (A) (known) $C_6H_5$-C(=N-CH$_3$)-S-P(=S)(OC$_2$H$_5$)$_2$ | 0.1 | 60 |
|  | 0.01 | 0 |
| (9) | 0.1 | 100 |
|  | 0.01 | 98 |
| (11) | 0.1 | 100 |
|  | 0.01 | 98 |
| (2) | 0.1 | 100 |
|  | 0.01 | 90 |
| (3) | 0.1 | 100 |
|  | 0.01 | 50 |
| (17) | 0.1 | 100 |
|  | 0.01 | 100 |
|  | 0.001 | 98 |
| (16) | 0.1 | 100 |
|  | 0.01 | 100 |
|  | 0.001 | 98 |
|  | 0.0001 | 60 |
| (5) | 0.1 | 100 |
|  | 0.01 | 98 |
|  | 0.001 | 80 |
| (13) | 0.1 | 98 |
|  | 0.01 | 75 |
| (4) | 0.1 | 100 |
|  | 0.01 | 40 |
| (15) | 0.1 | 100 |
|  | 0.01 | 100 |
|  | 0.001 | 90 |
|  | 0.0001 | 30 |
| (14) | 0.1 | 100 |
|  | 0.01 | 100 |
|  | 0.001 | 98 |
|  | 0.0001 | 30 | means that none of the spider mites were killed.

The active compounds, the concentrations of the active compounds, the evaluation times and the results can be seen from the following Table 4:

Table 4

(*Tetranychus* test/resistant)

| Active compound | Active compound concentration in % by weight | Degree of destruction in % after 2 days |
|---|---|---|
| 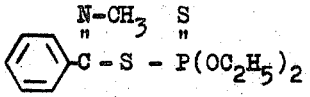 (known) (A) | 0.1 | 0 |
| (17) | 0.1 | 100 |
|  | 0.01 | 98 |
| (16) | 0.1 | 100 |
|  | 0.01 | 99 |
|  | 0.001 | 30 |
| (15) | 0.1 | 90 |
|  | 0.01 | 50 |
| (14) | 0.1 | 98 |
|  | 0.01 | 90 |
|  | 0.001 | 30 |

EXAMPLE 5

Limiting concentration test/soil insects
Test insect: *Phorbia brassicae*, grubs in the soil
Solvent: 3 parts by weight of acetone
Emulsifier: 1 part by weight of alkylaryl polyglycol ether To prepare a suitable preparation of active compound, 1 part by weight of active compound was mixed with the indicated amount of solvent, the indicated amount of emulsifier was added and the concentrate was diluted with water to the desired concentration. The preparation of the active compound was intimately mixed with the soil. In doing so, the concentration of the active compound in the preparation virtually did not matter, the only decisive factor being the amount by weight of active compound per unit volume of soil, which is quoted in ppm (for example mg/l). The soil was filled into pots and the pots were left to stand at room temperature. After 24 hours the test insects were introduced into the treated soil and after a further 48 hours the degree of effectiveness of the active compound was determined, in percent, by counting the dead and living test insects. The degree of effectiveness is 100% when all test insects had been killed and is 0% if exactly as many test insects were still alive as in the control.

The active compounds, the amounts applied and the results can be seen from the following Table 5:

Table 5

(*Phorbia brassicae* – grubs in the soil)

| Active compound | Degree of destruction in % at an active compound concentration of | | | | |
|---|---|---|---|---|---|
|  | 20 | 10 | 5 | 2.5 | 1.25 ppm |
| (5) | 100 | 100 | 100 | 100 | 50 |
| (10) | 100 | 100 | 50 |  |  |
| (8) | 100 | 100 | 100 | 95 | 75 |
| (11) | 100 | 95 | 50 |  |  |
| (15) | 100 | 100 | 50 |  |  |
| (16) | 100 | 100 | 95 | 50 |  |
| (17) | 100 | 100 | 100 | 100 | 50 |
| 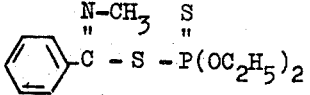 (known) (A) | 0 | | | | |

EXAMPLE 6

Mosquito larvea test
Test insects: Aedes aegypti larvae
Solvent: 99 parts by weight of acetone
Emulsifier: 1 part by weight of benzylhydroxydiphenyl polyglycol ether To produce a suitable preparation of active compound, 2 parts by weight of the active compound were dissolved in 1,000 parts by volume of the solvent containing the amount of emulsifier stated above. The solution thus obtained was diluted with water to the desired lower concentrations.

The aqueous preparations of the active compounds were placed in glass vessels and about 25 mosquito larvae were then placed in each glass vessel.

After 24 hours, the degree of destruction was determined as a percentage. 100% means that all the larvae were killed. 0% means that no larvae at all were killed.

The active compounds, the concentrations of the active compounds, the test insects and the results can be seen from the following Table 6:

Test insects: Aedes aegypti
Solvent: Acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per cm² of filter paper varied with the concentration of the solution of active compound used. About 25 test insects were then placed in the Petri dish and it was covered with a glass lid.

The condition of the test insects was continuously observed. The time which is necessary for a 100% knock down effect was determined.

The test insects, the active compounds, the concentrations of the active compounds and the periods of time (' = minutes) at which there is a there is a 100% knock down effect can be seen from the following Table 7:

Table 6

(Mosquito larvae test)

| Active compound | Active compound concentration of the solution, in ppm | Degree of destruction in % |
|---|---|---|
| (known) (A) | 10 | 40 |
| (11) | 10 | 100 |
|      | 1  | 100 |
| (12) | 10 | 100 |
|      | 1  | 70  |
| (14) | 10 | 100 |
|      | 1  | 100 |
| (15) | 10 | 100 |
|      | 1  | 100 |
| (16) | 10 | 100 |
|      | 1  | 100 |
|      | 0.1 | 100 |
| (17) | 10 | 100 |
|      | 1  | 100 |
|      | 0.1 | 100 |

EXAMPLE 7

LT₁₀₀ test for Diptera

Table 7

(LT₁₀₀ test for Diptera)

| Active compound | Active compound concentration of the solution in % by weight | LT₁₀₀ |
|---|---|---|
| (known) (A) | 0.2 | 3 hrs, 0% |

TABLE 7—Continued

| | | |
|---|---|---|
| (9) | 0.2 | 60' |
| | 0.02 | 60' |
| | 0.002 | 180' |
| (10) | 0.2 | 120' |
| | 0.02 | 180' |
| | 0.002 | 180' |
| (11) | 0.2 | 60' |
| | 0.02 | 120' |
| (14) | 0.2 | 120' |
| | 0.02 | 180' |
| (16) | 0.2 | 60' |
| | 0.02 | 120' |

EXAMPLE 8

$LT_{100}$ test for Diptera
Test insects: *Musca domestica*
Solvent: Acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per cm² of filter paper varied with the concentration of the solution of active compound used. About 25 test insects were then placed in the Petri dish and it was covered with a glass lid.

The condition of the test insects was continuously observed. The time which was necessary for a 100% knock down effect was determined.

The test insects the active compounds, the concentrations of the active compounds and the periods of time (' = minutes) at which there is a 100% knock down effect can be seen from the following Table 8:

Table 8

($LT_{100}$ test for Diptera)

| Active compound | Active compound concentration of the solution in % by weight | $LT_{100}$ |
|---|---|---|
| 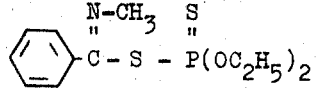 (known) (A) | 0.2 | 8 hrs. |
| (2) | 0.2 | 105' |
| | 0.02 | 120' |
| | 0.002 | 205' |
| (3) | 0.2 | 65' |
| | 0.02 | 120' |
| | 0.002 | 135' |
| (1) | 0.2 | 95' |
| | 0.02 | 120' |
| (9) | 0.2 | 80' |
| | 0.02 | 195' |
| (5) | 0.2 | 60' |
| | 0.02 | 105' |
| (8) | 0.2 | 70' |
| | 0.02 | 110' |
| | 0.002 | 6 hrs. |
| (11) | 0.2 | 90' |
| | 0.02 | 240' |
| (14) | 0.2 | 75' |
| | 0.02 | 125' |
| (16) | 0.2 | 60' |
| | 0.02 | 240' |

EXAMPLE 9

Test with parasitic fly larvae
Solvent: 35 parts by weight of ethylene glycol monomethyl ether
35 parts by weight of nonylphenol polyglycol ether To prepare an appropriate preparation of active compound, 30 parts by weight of the active substance in question were mixed with the indicated amount of solvent which contained the abovementioned proportion of emulsifier, and the concentrate thus obtained was diluted with water to the desired concentration.

About 20 fly larvae (*Lucilia cuprina*) were introduced into a test tube which contained a cottonwool plug impregnated with nutrient medium. 0.5 ml of the active compound preparation was placed on this medium. After 24 hours the degree of destruction in % was determined. Here, 100% means that all larvae had been killed and 0% means that no larvae had been killed.

The active compounds examined, the concentrations tested and the findings obtained can be seen from the following Table 9:

Table 9

(Test with parasitic fly larvae)

| Active compound | Active compound concentration in ppm | Degree of destruction in % (*Lucilia cuprina*) |
|---|---|---|
| (2) | 100 | 100 |
|  | 30 | 100 |
|  | 10 | 100 |
|  | 3 | 100 |
|  | 1 | 100 |
|  | 0.3 | 100 |
|  | 0.1 | >50 |
| (4) | 100 | 100 |
|  | 30 | 100 |
|  | 10 | >50 |
| (7) | 100 | 100 |
|  | 30 | 100 |
|  | 10 | 100 |
|  | 3 | 100 |
|  | 1 | 100 |
| (8) | 100 | 100 |
|  | 30 | 100 |
|  | 10 | 100 |
|  | 3 | 100 |
| (3) | 100 | 100 |
|  | 10 | 100 |
| (10) | 100 | 100 |
|  | 30 | 100 |
|  | 10 | 100 |
|  | 3 | 100 |
| (5) | 100 | 100 |
|  | 30 | 100 |
|  | 10 | 100 |
|  | 3 | 100 |
|  | 1 | <50 |
| (11) | 100 | 100 |
|  | 30 | 100 |
|  | 10 | 100 |
|  | 3 | 100 |
|  | 1 | <50 |
| (12) | 100 | 100 |
|  | 30 | 100 |
|  | 10 | 100 |
|  | 3 | 100 |
| (13) | 100 | 100 |
|  | 30 | 100 |
|  | 10 | 100 |
|  | 3 | <50 |
| (15) | 100 | 100 |
|  | 10 | 100 |
|  | 1 | 100 |
| (16) | 100 | 100 |
|  | 10 | 100 |
|  | 1 | 100 |
| (14) | 100 | 100 |
|  | 10 | 100 |
|  | 1 | 100 |
| (17) | 100 | 100 |
|  | 10 | 100 |
|  | 1 | 100 |

It will be appreciated that the instant specification and examples are set forth by way of illustration and not limitation and that various modifications and changes may be made without departing from the spirit and scope of the present invention.

What is claimed is:

1. An 0-(N-alkoxy-benzimidoyl)-(thiono)-phosphoric (phosphonic) acid ester of the formula

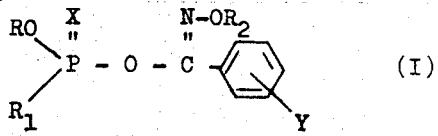

in which

R and $R_2$ each independently is alkyl of 1 to 6 carbon atoms, $R_1$ is alkyl or alkoxy of 1 to 6 carbon atoms, X is oxygen or sulfur, and Y is lower alkoxy or alkylmercapto.

2. A compound according to claim 1 in which R is alkyl of 1 to 4 carbon atoms, $R_1$ is alkyl or alkoxy of 1 to 4 carbon atoms, $R_2$ is methyl, ethyl, n-propyl or isopropyl, and Y is methoxy, ethoxy, methylmercapto or ethylmercapto.

3. The compound according to claim 1 wherein such compound is 0,0-diethyl-0-(N-ethoxy-2-methoxybenzimidoyl)thionophosphoric acid ester of the formula

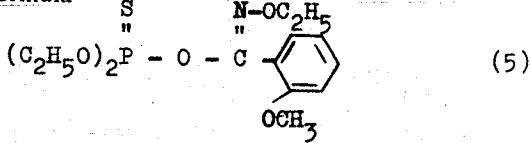

4. The compound according to claim 1 wherein such compound is 0,0-diethyl-0-(N-ethoxy-2-methylmercaptobenzimidoyl)-thionophosphoric acid ester of the formula

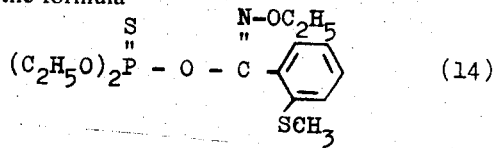

5. The compound according to claim 1 wherein such compound is 0,0-dimethyl-0-(N-ethoxy-2-methylmercaptobenzimidoyl)-thionophosphoric acid ester of the formula

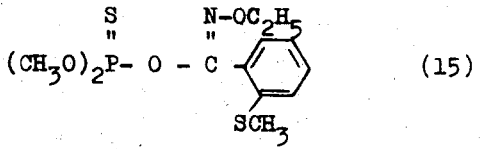

6. The compound according to claim 1 wherein such compound is 0,0-diethyl-0-(N-methoxy-2-methylmercaptobenzimidoyl)-thionophosphoric acid ester of the formula

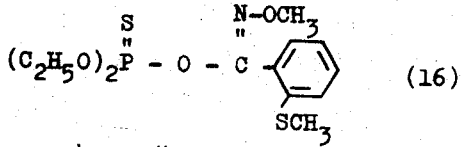

7. The compound according to claim 1 wherein such compound is 0,0-dimethyl-0-(N-methoxy-2-methylmercaptobenzimidoyl)-thionophosphoric acid ester of the formula

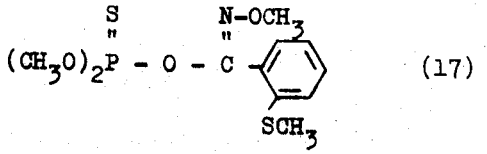

* * * * *